United States Patent
Weckel et al.

(10) Patent No.: US 11,297,241 B2
(45) Date of Patent: *Apr. 5, 2022

(54) DYNAMIC SYNCHRONIZATION OF FRAME RATE TO A DETECTED CADENCE IN A TIME LAPSE IMAGE SEQUENCE

(71) Applicant: GoPro, Inc., San Mateo, CA (US)

(72) Inventors: Charles Weckel, Cupertino, CA (US); Vishwanatha Bhat, San Ramon, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,872

(22) Filed: Apr. 27, 2020

(65) Prior Publication Data

US 2020/0259984 A1 Aug. 13, 2020

Related U.S. Application Data

(63) Continuation of application No. 16/062,711, filed as application No. PCT/US2016/066086 on Dec. 12, (Continued)

(51) Int. Cl.
*H04N 5/232* (2006.01)
*G06T 7/262* (2017.01)
*H04N 5/235* (2006.01)

(52) U.S. Cl.
CPC ........... *H04N 5/2329* (2013.01); *G06T 7/262* (2017.01); *H04N 5/2327* (2013.01); (Continued)

(58) Field of Classification Search
CPC ........... H04N 5/23232; H04N 5/23248; H04N 5/23258; H04N 5/2327; H04N 5/2329; H04N 5/2353; G06T 7/262
See application file for complete search history.

(56) References Cited

U.S. PATENT DOCUMENTS 5,309,250 A * 5/1994 Giacometti ............. F41G 3/326
  348/208.99
7,003,154 B1 2/2006 Peker
(Continued)

FOREIGN PATENT DOCUMENTS

| JP | 4516456 B2 * | 8/2010 |
| JP | 2010171748 A | 8/2010 |
| JP | 2011250339 A | 12/2011 |

OTHER PUBLICATIONS

European Patent Office Examination Report for Application No. 16826226.9 dated Feb. 1, 2019, 5 pages.
(Continued)

*Primary Examiner* — Chiawei Chen
(74) *Attorney, Agent, or Firm* — Young Basile Hanlon & MacFarlane, P.C.

(57) ABSTRACT

A frame rate is synchronized to a detected cadence in order to generate an output image sequence that is substantially stabilized. In an in-camera process, a camera receives motion data of the camera while the camera captures the sequence of image frames. A dominant frequency of motion is determined and the capture frame rate is dynamically adjusted to match the frequency of detected motion so that each image frame is captured when the camera is at approximately the same position along the axis of motion. Alternatively, in a post-processing process, frames of a captured image sequence are selectively sampled at a sampling rate corresponding to the dominant frequency of motion so that each sampled frame corresponds to an image capture that occurred when the camera is at approximately the same position along the axis of motion.

20 Claims, 5 Drawing Sheets

Related U.S. Application Data 2016, now Pat. No. 10,638,047, which is a continuation of application No. 14/970,866, filed on Dec. 16, 2015, now Pat. No. 9,787,900, and a continuation of application No. 14/970,869, filed on Dec. 16, 2015, now Pat. No. 9,779,777.

(52) U.S. Cl.
CPC ....... *H04N 5/2353* (2013.01); *H04N 5/23232* (2013.01); *H04N 5/23248* (2013.01); *H04N 5/23258* (2013.01)

(56) References Cited

U.S. PATENT DOCUMENTS

| | | | | |
|---|---|---|---|---|
| 7,460,773 | B2* | 12/2008 | Ziemkowski | ........ G02B 27/646 348/208.99 |
| 7,756,407 | B2 | 7/2010 | Raskar | |
| 9,509,894 | B1* | 11/2016 | Dyer | .................. G06K 9/00791 |
| 2007/0127902 | A1* | 6/2007 | Ziemkowski | ...... H04N 5/23248 396/52 |
| 2009/0041126 | A1* | 2/2009 | Murabayashi | ....... H04N 19/103 375/240.16 |
| 2009/0174782 | A1 | 7/2009 | Kahn | |
| 2010/0253838 | A1 | 10/2010 | Garg | |
| 2011/0298937 | A1 | 12/2011 | Ogawa | |
| 2012/0033138 | A1 | 2/2012 | Li | |
| 2012/0057034 | A1* | 3/2012 | Tanaka | ............... H04N 5/23218 348/208.1 |
| 2012/0148216 | A1 | 6/2012 | Pavagada | |
| 2013/0044228 | A1 | 2/2013 | Corey | |
| 2013/0076921 | A1 | 3/2013 | Owen | |
| 2014/0160309 | A1* | 6/2014 | Karpenko | ............ H04N 5/2329 348/208.6 |
| 2014/0307110 | A1 | 10/2014 | Liu | |
| 2015/0248916 | A1 | 9/2015 | Kopf | |
| 2016/0182866 | A1 | 6/2016 | Landqvist | |
| 2016/0330399 | A1* | 11/2016 | Joshi | ...................... G11B 27/02 |
| 2017/0013192 | A1* | 1/2017 | Yang | .................... H04N 5/2258 |
| 2017/0026580 | A1* | 1/2017 | Gyotoku | ............ H04N 5/23287 |
| 2017/0227162 | A1* | 8/2017 | Saika | ................... F16M 11/041 |

OTHER PUBLICATIONS

PCT International Search Report and Written Opinion for PCT/US2016/066086, dated Mar. 10, 2017, 13 Pages.

Poleg Yair et al, "EgoSampling: Fast-forward and stereo for egocentric videos", 2015 IEEE Conference on Computer Vision and Pattern Recognition (CVPR), IEEE, Jun. 7, 2015 (Jun. 7, 2015), doi:10.1109/CVPR.2015.7299109, pp. 4768-4776, XP032793935.

Partial European Search Report for App No. EP20154731.2, dated May 8, 2020, 16 pages.

Extended European Search Report for App No. EP20154731.2, dated Aug. 12, 2020, 13 pages.

* cited by examiner

DYNAMIC SYNCHRONIZATION OF FRAME RATE TO A DETECTED CADENCE IN A TIME LAPSE IMAGE SEQUENCE

CROSS-REFERENCE TO RELATED APPLICATION(S)

This application is a continuation of U.S. patent application Ser. No. 16/062,711, filed Jun. 15, 2018, which is a national stage entry Application of PCT Application No. PCT/US2016/066086, filed Dec. 12, 2016, which claims priority to U.S. patent application Ser. No. 14/970,866, filed Dec. 16, 2015, now U.S. Pat. No. 9,787,900, and to U.S. patent application Ser. No. 14/970,869, filed Dec. 16, 2015, now U.S. Pat. No. 9,779,777, the entire disclosures of which are hereby incorporated by reference.

TECHNICAL FIELD

This disclosure relates to digital photography, and more specifically, to synchronizing a frame rate of a time lapse image sequence.

BACKGROUND

Action cameras may capture a variety of activities, such as sports and action sequences, which are performed by users. When the action camera is mounted to the user, some activities introduce relatively high amplitude motion that results in unstabilized video or image sequences. Examples of such activities include running, biking, swimming, equestrian sports, and so on. During running, for example, the running motion creates a rhythmic up and down movement that results in a recording that has an undesirable vertical motion as the camera moves up and down after each step. A similar problem may occur when a camera is mounted to a moving object such as an automobile, motorcycle, bicycle, or flying vehicle (e.g., an unmanned aerial vehicle).

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

In a first embodiment, camera dynamically synchronizes a frame rate to a detected cadence by adjusting the frame rate during image capture. A camera is configured to operate according to an initial frame rate. A capture of a time lapse image sequence is initiated on the camera according to the initial frame rate. Motion data of the camera is recorded during the capture of the time lapse image sequence by one or more sensors tracking motion of the camera while the camera captures the time lapse image sequence. The motion data in a particular window of time is converted from time domain data to frequency domain data. A dominant frequency is determined in the frequency domain data. A modified frame rate is then determined that is within a predefined tolerance range of the dominant frequency. Capture of the time lapse image sequence is then continued according to the modified frame rate.

In a second embodiment, a frame rate is synchronized to a detected cadence in post-processing by selectively sampling frames of the captured image sequence. A sequence of image frames having a first frame rate is received. Motion data of a camera recorded is also received from one or more sensors tracking motion of the camera while the camera captures the sequence of image frames. The motion data in a particular window of time is converted from time domain data to frequency domain data. A dominant frequency in the frequency domain data is determined for the particular window of time. Frames are then sampled from the sequence of image frames in the particular window of time that are at a sampling frequency that is within a predefined tolerance of the dominant frequency. A new image sequence is created with the sampled frames.

Example Media Processing System

Figure 1:
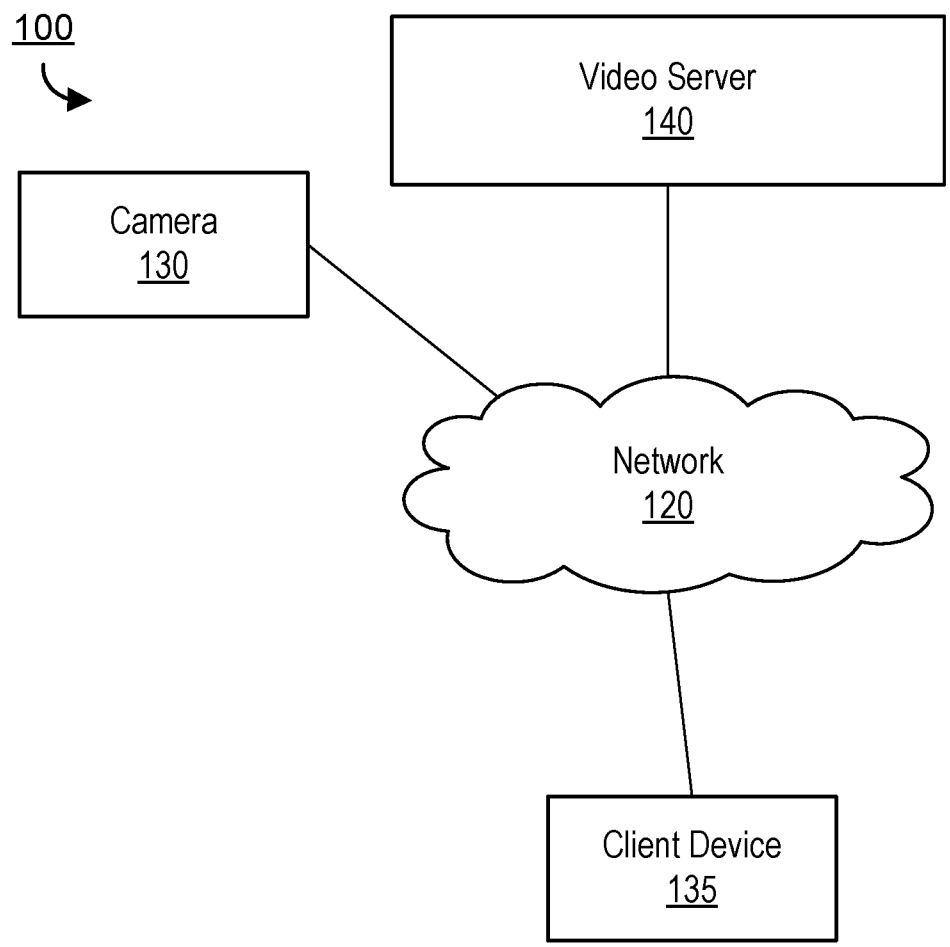
FIG. 1 illustrates an example embodiment of a media processing system.

FIG. 1 is a block diagram of a media processing system 100, according to one embodiment. The media content system 100 includes a network 120, a camera 130, a client device 135 and a video server 140. In alternative configurations, different and/or additional components may be included in the media content system 100.

The camera 130 comprises a camera body, one or more a camera lenses, various indicators on the camera body (such as LEDs, displays, and the like), various input mechanisms (such as buttons, switches, and touch-screen mechanisms), and electronics (e.g., imaging electronics, power electronics, metadata sensors, etc.) internal to the camera body for capturing images via the one or more lenses and/or performing other functions. In embodiment, the camera 130 is mounted to a user using, for example, a helmet or head mount, chest mount, or wrist mount. In another embodiment, the camera 130 is mounted to a moving object such as an automobile, motorcycle, bicycle, or flying vehicle (e.g., an unmanned aerial vehicle).

As described in greater detail in conjunction with FIG. 2 below, the camera 130 can include sensors to capture metadata associated with video data, such as timing data, motion data, speed data, acceleration data, altitude data, GPS data, 3 D positional data, and the like. In a particular embodiment, position, motion, and/or time centric metadata (time, position, speed, etc.) can be incorporated into a media file together with the captured content in order to track position or movement of the camera 130 over time. This metadata may be captured by the camera 130 itself or by another device (e.g., a mobile phone) proximate to the camera 130 or physically coupled to the camera 130. In one embodiment, the metadata may be incorporated with the content stream by the camera 130 as the content is being captured. In another embodiment, a metadata file separate from the video file may be captured (by the same capture device or a different capture device) and the two separate files can be combined or otherwise processed together in post-processing.

The video server 140 receives and stores images and videos captured by the camera 130 and allows users to access the images and videos at a later time. In one embodiment, the video server 140 provides the user with an interface, such as a web page or native application installed on the client device 135, to interact with and/or edit the stored images and videos. A user can interact with interfaces provided by the video server 140 via the client device 135. The client device 135 is any computing device capable of receiving user inputs as well as transmitting and/or receiving data via the network 120. In one embodiment, the client device 135 is a conventional computer system, such as a desktop or a laptop computer. Alternatively, the client device 135 may be a device having computer functionality, such as a personal digital assistant (PDA), a mobile telephone, a smartphone or another suitable device. The user can use the client device 135 to view and interact with or edit images and videos stored on the video server 140.

In one embodiment, the client device 135 interacts with the video server 140 through an application programming interface (API) running on a native operating system of the client device 135, such as IOS® or ANDROID™. While FIG. 1 shows a single client device 135, in various embodiments, any number of client devices 135 may communicate with the video server 140.

The video server 140 communicates with the client device 135 and/or the camera 130 via the network 120, which may include any combination of local area and/or wide area networks, using both wired and/or wireless communication systems. In one embodiment, the network 120 uses standard communications technologies and/or protocols. In some embodiments, all or some of the communication links of the network 120 may be encrypted using any suitable technique or techniques. It should be noted that in some embodiments, the functionalities attributed to the video server 140 may instead be performed by the camera 130 or the client device 135.

Various components of the environment 100 of FIG. 1 such as the camera 130, video server 140, and client device 125 can include one or more processors and a non-transitory computer-readable storage medium storing instructions therein that when executed cause the processor to carry out the functions attributed to the respective devices described herein.

Example Camera Configuration

Figure 2:
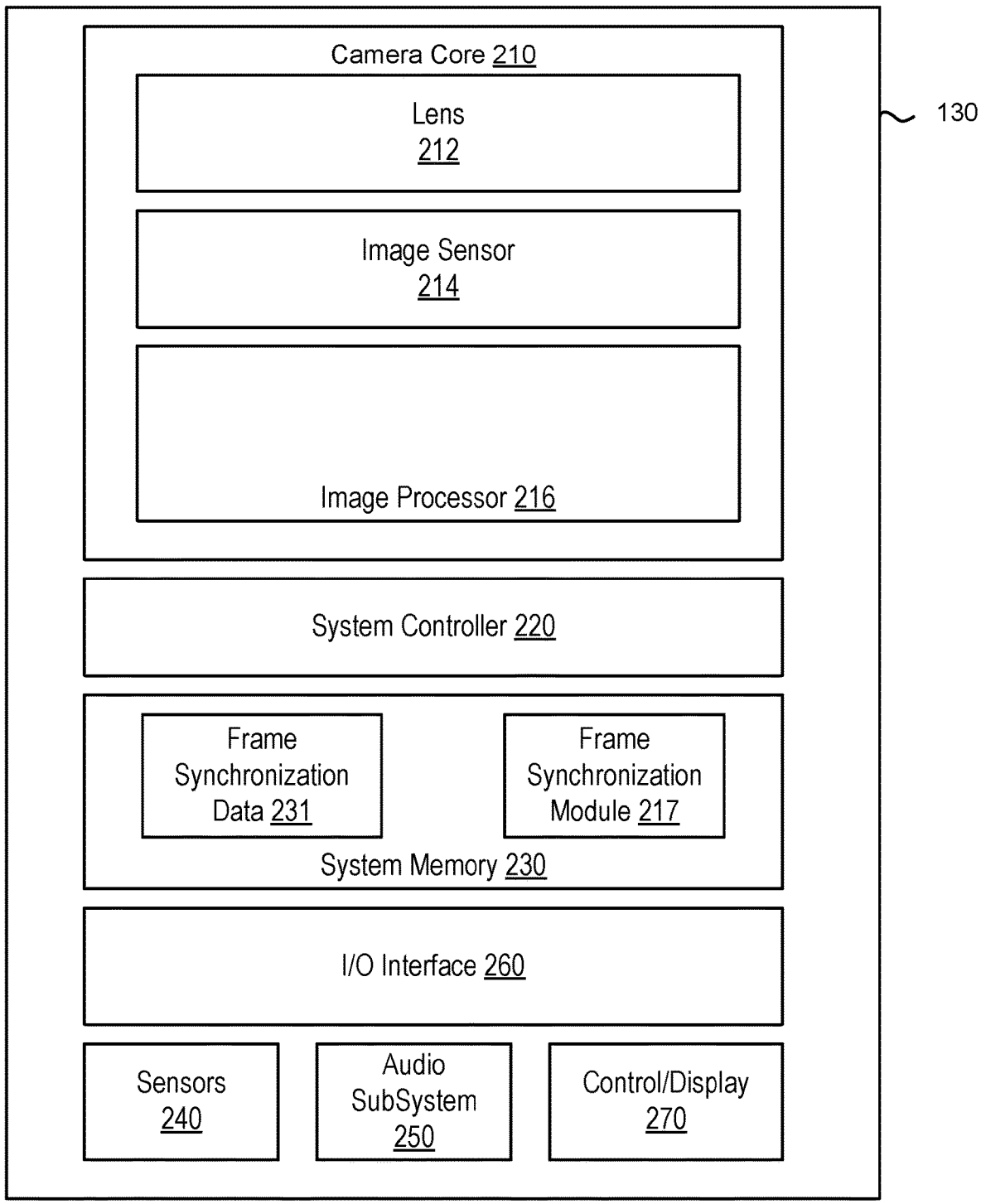
FIG. 2 illustrates an example architecture of a camera.

FIG. 2 is a block diagram illustrating a camera 130, according to one embodiment. In the illustrated embodiment, the camera 130 comprises a camera core 210 comprising a lens 212, an image sensor 214, and an image processor 216. The camera 130 additionally includes a system controller 220 (e.g., a microcontroller or microprocessor) that controls the operation and functionality of the camera 130 and system memory 230 configured to store executable computer instructions that, when executed by the system controller 220 and/or the image processors 216, perform the camera functionalities described herein. In some embodiments, the system memory 230 stores a frame synchronization module 217 and frame synchronization data 231.

The lens 212 can be, for example, a standard lens, wide angle lens, hemispherical, or hyperhemispherical lens that focuses light entering the lens to the image sensor 214 which captures images and/or video frames. The image sensor 214 may capture high-definition images having a resolution of, for example, 720p, 1080p, 4k, or higher. The image processor 216 performs one or more image processing functions of the captured images or video. For example, the image processor 216 may perform a Bayer transformation, demosaicing, noise reduction, image sharpening, image stabilization, rolling shutter artifact reduction, color space conversion, compression, or other in-camera processing functions. Processed images and video may be temporarily or persistently stored to system memory 230 and/or to a non-volatile storage, which may be in the form of internal storage or an external memory card.

An input/output (I/O) interface 260 transmits and receives data from various external devices. For example, the I/O interface 260 may facilitate the receiving or transmitting video or audio information through an I/O port. Examples of I/O ports or interfaces include USB ports, HDMI ports, Ethernet ports, audioports, and the like. Furthermore, embodiments of the I/O interface 260 may include wireless ports that can accommodate wireless connections. Examples of wireless ports include Bluetooth, Wireless USB, Near Field Communication (NFC), and the like. The I/O interface 260 may also include an interface to synchronize the camera 130 with other cameras or with other external devices, such as a remote control, a second camera 130, a smartphone, a client device 135, or a video server 140.

A control/display subsystem 270 includes various control and display components associated with operation of the camera 130 including, for example, LED lights, a display, buttons, microphones, speakers, and the like. The audio subsystem 250 includes, for example, one or more microphones and one or more audio processors to capture and process audio data correlated with video capture. In one embodiment, the audio subsystem 250 includes a microphone array having two or microphones arranged to obtain directional audio signals.

In one embodiment, the camera 130 captures an image sequence as a time lapse image sequence. Here, the camera 130 captures a single frame between fixed intervals of time. The time-lapse recording may be played back (or rendered into a video) at a standard video frame rate equal (e.g., 30 fps or 60 fps) that may be substantially higher than the time lapse frame rate, In this case the output video will have the effect of playing back compressed in time, such that the time to play back the video is accelerated relative to the time it took to capture the image sequence. In an alternative embodiment, the same effect can be generated by capturing a video with a standard frame rate (e.g., 30 fps or 60 fps) and then retaining only a subset of frames (e.g., every x frames) while discarding the remaining frames so as to compress the video in time. This produces an effect similar to the time lapse effect described above.

The sensors 240 capture various metadata concurrently with, or separately from, image and video capture. For example, the sensors 240 may capture time-stamped position, orientation, and/or motion data and may include, for example, an orientation sensor, an accelerometer, a gyroscope, or a magnetometer. Sensor data captured from the various sensors 240 may be processed to generate other types of metadata. For example, sensor data from the accelerometer may be used to generate motion metadata, comprising velocity and/or acceleration vectors representative of motion of the camera 130. Furthermore, sensor data from the may be used to generate orientation metadata describing the orientation of the camera 130. In one embodiment, the sensors 240 are rigidly coupled to the camera 130 such that any motion, orientation or change in location experienced by the camera 130 is also experienced by the sensors 240. In an alternative embodiment, the sensors 240 may be integrated with a different device other than the camera 130 itself. For example, the sensors 240 may be integrated with an unmanned aerial vehicle carrying the camera 130 and provide the sensor data to the camera 130.

The sensors 240 furthermore may associate a time stamp representing when the data was captured by each sensor. In one embodiment, the sensors 240 automatically begin collecting sensor metadata when the camera 130 begins to record a video or capture images. The sensor data may be correlated to different frames of the time lapse or video capture such that each frame is associated with motion and/or position data describing the motion and/or position of the camera 130 at the time that frame was captured. This data may be stored as frame synchronization data 231, which may comprise the sensor data, positional data, frequency domain conversions, and other data used by the frame synchronization module 217 used to synchronize frame rate as will be described in further detail below.

In one embodiment, the system memory 230 stores a frame synchronization module 217 that facilitates synchronization of the frame rate with a detected cadence. While the camera 130 is recording video or time lapse images, the camera 130 may undergo motion that causes an unstabilized output image sequence. For example, during certain activities such as running, jogging, horseback riding, or so on when the camera 130 is mounted to the user, the camera may experience up and down movement based on a cadence of the motion. In the case of running, for example, the cadence of the runner may correspond to the runner's step rate, which is translated to oscillating movement of the user-mounted camera 130. If the motion is substantially sinusoidal over time as is generally the case with a runner moving at an approximately constant pace and steady gait, the frame synchronization module 217 can detect the frequency of this oscillation, and adjust the capture frame rate so that each frame is captured when the camera 130 is at approximately the same vertical position (e.g., at the bottom of the gait each time a foot hits the ground). The results in an image sequence that is substantially stabilized. In other use case scenarios when the camera is mounted to an unmanned aerial vehicle or other moving object, the cadence may correspond to a natural oscillation in the movement of the object (e.g., up and down movement, side-to-side movement, or both). This oscillation frequency may similarly be detected and the frame rate adjusted so that each frame is captured when the camera 130 is at approximately the same position along the axis of oscillation, thus resulting in a substantially stabilized image sequence.

In another embodiment, the frame synchronization module 217 instead operates on a buffered window of frames and selectively retaining only frames that were captured when the camera 130 was at a particular position along the axis of oscillation and discarding other frames, similarly resulting in an image sequence that is substantially stabilized. The frame synchronization module 217 may periodically adjust the frame rate as the cadence changes. An additional effect of this frame rate synchronization is that the capture frame rate tends to increase as the user or object on which the camera is attached moves faster and the capture frame rate tends to decrease as the user or object moves slower. Thus, the length of the output image sequence may be more closely tied to the number of steps covered regardless of the user's or object's speed.

In one embodiment, the frame synchronization module 217 computes positional data (relative to a fixed point in space) based on the frame synchronization data 231 from the sensors 240. For example, the synchronization module 217 may determine changes in direction based on the data recorded by the accelerometer, and estimate the resulting speed and/or position based on the amount of acceleration recorded. In one embodiment, the frame synchronization module 217 computes the positional data in real time during the recording process. When computing the positional data in real time, the frame synchronization module 217 uses the prior and current sensor data to determine the current position of the camera 130. In other embodiments, the frame synchronization module 217 computes the positional data from the accelerometer data after the recording is concluded in a post-processing step. In another embodiment, positional data is not necessarily computed and the frame synchronization module 217 may determine the frame rate based directly on acceleration or velocity data. In yet other embodiments, positional data is obtained from a velocity or position sensor instead of an accelerometer.

In one embodiment, the camera 130 may adjust the sampling rate of the sensor data to ensure that the sampling rate exceeds the Nyquist frequency for an expected maximum cadence. The Nyquist frequency for the system may be determined a priori by experimentation based on the maximum cadence measured for any activity and be set to this fixed value. Multiple different sampling frequencies may be programmable or automatically selected based on different factors, such as the current speed of the camera 130. In one embodiment, the frame synchronization module 217 interpolates the sensor data such that the sampling rate is above a rate to perform a proper frequency domain analysis of the positional data.

In one embodiment, a frequency analysis is performed on the sensor data. For example, the frame synchronization module 217 may convert the time domain positional data to a frequency domain using, for example, a discrete Fourier transform that may be implemented using a fast Fourier transform algorithm (e.g., Cooley-Tukey). In one embodiment, the frame synchronization module 217 performs the Fourier transform in real time on small slices (e.g., a predetermined number of frames or time interval) of positional data as the data is determined in real time from real time sensor data. In one embodiment, the frame synchronization module 217 performs the Fourier transform subsequent to the completion of the recording.

After converting the positional data to the frequency domain, the frame synchronization module 217 determines the frequency of the oscillations using the converted positional data. In one embodiment, only the dominant frequency having the largest magnitude of the positional data is used. In another embodiment, when multiple frequencies have magnitudes within a certain range of the dominant frequency, and when these multiple frequencies are within a certain frequency range of each other, the frame synchronization module 217 may take the average frequency of those multiple frequencies along with the dominant frequency, and selects this average frequency as the dominant frequency that represents the frequency of the detected cadence.

Once the frequency of the oscillations is determined, the frame synchronization module 217 modifies the interval of the time-lapse image sequence such that each frame of the time-lapse image sequence corresponds to a capture frame rate similar to the detected frequency of the oscillations. In this way, the frames of the recording will be captured at a similar vertical position, and the effect of the oscillations on the recording are diminished. To better match the frequency of the oscillations, in one embodiment, the frame synchronization module 217 increases the capture interval when the frequency of the oscillations is determined to be lower than the frequency of the current frame rate of the recording (i.e., time/interval>oscillation frequency), and decreases the interval when the frequency of the oscillations is determined to be higher than the frequency of the current frame rate of the recording.

In one embodiment, the interval is adjusted periodically during recording based on a prior window of time such that the rate of capture for frames may change over time based on changes in the oscillation frequency (e.g., due to a runner or object on which the camera is mounted changing pace). In other embodiments, where the frames are selected in post-processing instead of during capture, the frame synchronization module 217 modifies the interval between the retained frames for different frame ranges in order to match detected changes in the cadence. Here, the frame synchronization module 217 may analyze the recorded video by sections, and apply a different interval to each section based on the dominant frequency in that section as recorded in the sensor data.

In one embodiment, the frame synchronization module 217 and frame synchronization data 231 resides on a server or client device (e.g., video server 140 or client device 135) instead of the camera 130. In this embodiment, the server or client device having the frame synchronization module 217 receives the recorded frames (i.e., the recording or time lapse image frames) and motion data to perform the synchronization of the frame rate to the cadence in post-processing.

Exemplary Positional Data in Time and Frequency Domain

Figure 3:
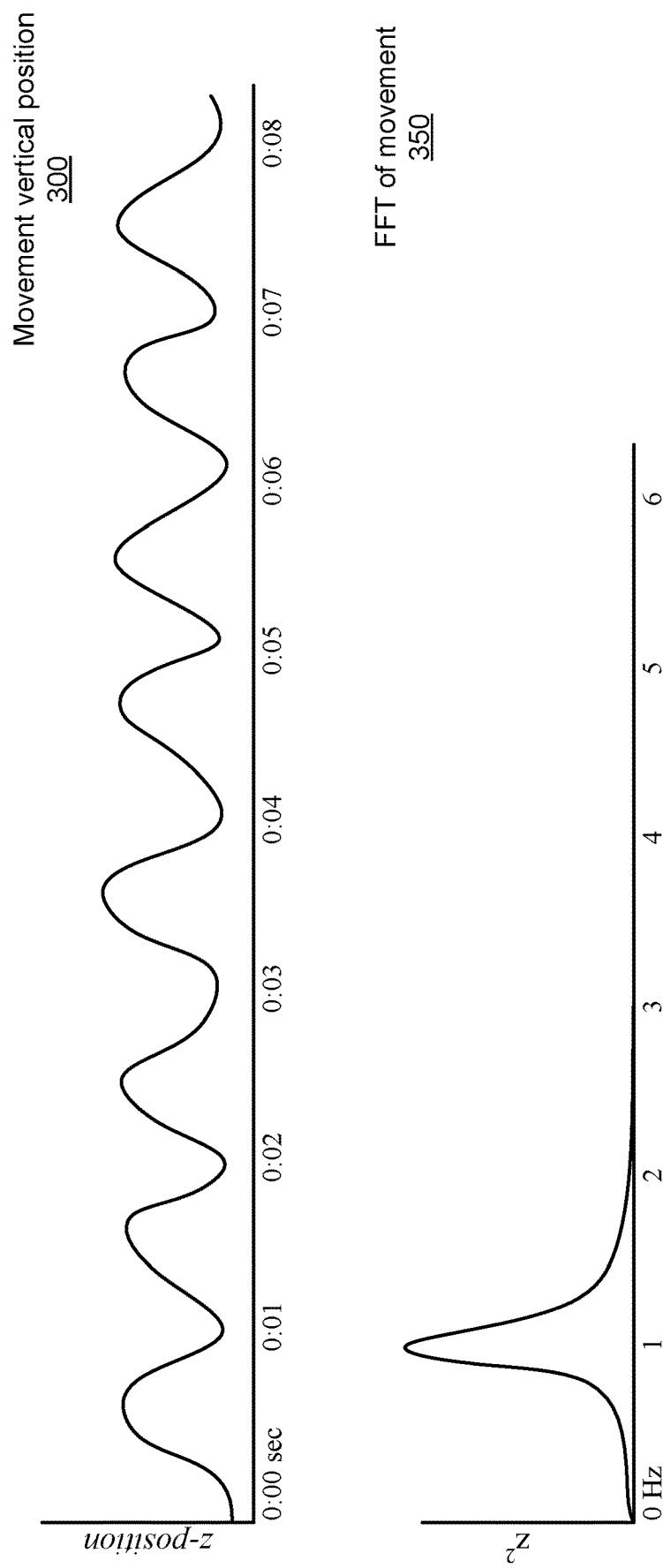
FIG. 3 illustrates exemplary graphs of motion data in a time domain and converted to a frequency domain.

FIG. 3 illustrates exemplary graphs of positional data in a time domain 300 and converted to a frequency domain 350. The graphs 300 and 350 are intended for illustrative purposes only, and are not necessarily drawn to scale and are not necessarily mathematically accurate. Graph 300 illustrates exemplary positional data recorded during a window of time that may be part of a larger recording session as described above. Here, the positional data represents relative position of the camera 130 in a vertical direction over time. As illustrated, the positional data in graph 300 indicates movement of the camera 130 having a fundamental oscillation period of approximately one second. This might correspond to a slow jog or brisk walking motion of the user that the camera 130 is attached to at a pace of approximately one step per second in which each local minimum may roughly correspond to time instances when the user's foot hits the ground and each local maximum may roughly correspond to instances between steps when the user is at the peak of his or her gait. Different oscillation periods may be applicable when the camera 130 is attached to an unmanned aerial vehicle or other moving object.

Graph 350 illustrates the positive portion of the frequency domain conversion of the data in graph 300. The data may be converted in the same manner as described above (e.g., by fast Fourier transform). A maximum value is seen at approximately 1 Hz, corresponding to the fundamental period of the time-domain data in graph 300. The frame rate of the image sequence can then be modified to match the determined fundamental frequency associated with the camera movement. As will be apparent from the graph 300, if a frame is captured once per second, the vertical position of the camera 130 at the time of capture will remain approximately constant, thereby resulting in substantially stabilized image sequence. This frequency analysis and frame rate adjustment may be re-performed in subsequent time windows so as to periodically adjust as the frequency of the camera movement changes over time (e.g., when a runner slows down or speeds up).

Figure 4:
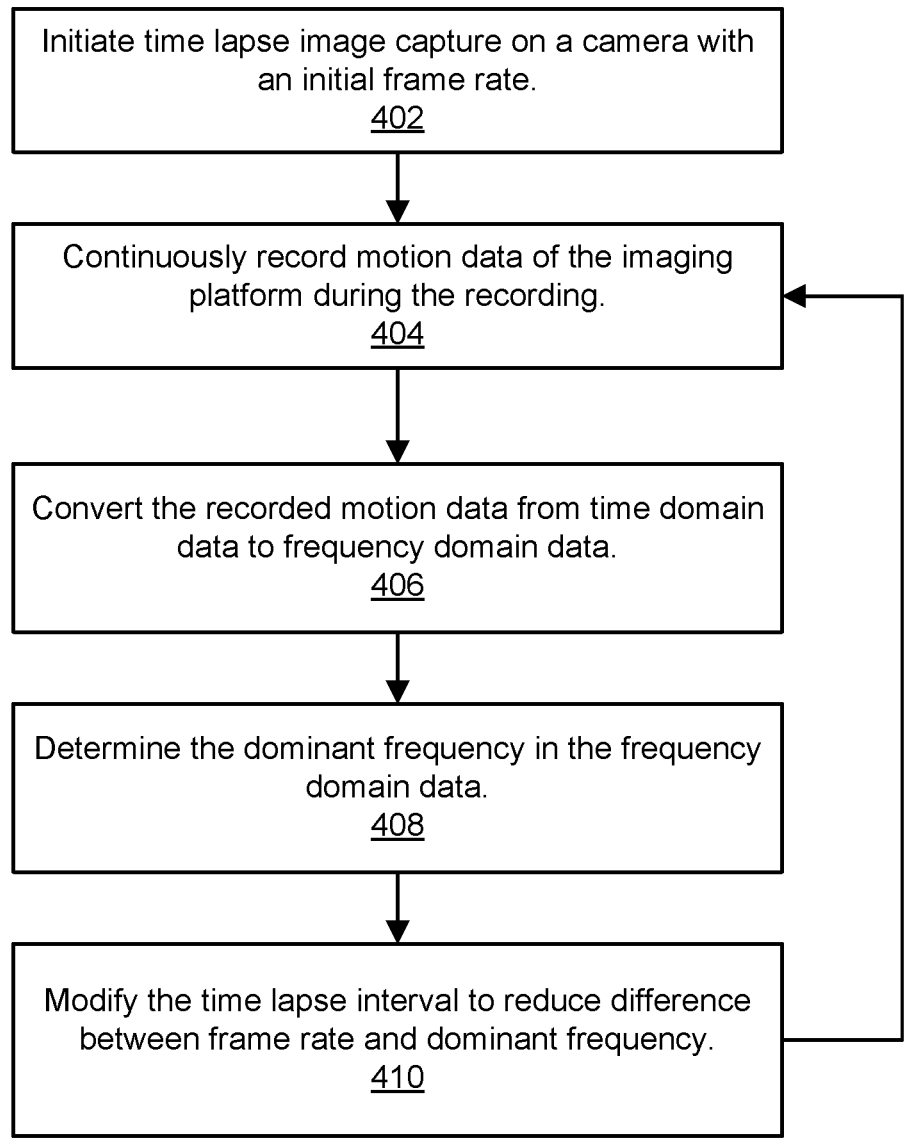
FIG. 4 illustrates an example embodiment of a process for synchronizing a frame rate to a detected cadence during a recording in real time.

Process for Synchronizing a Frame Rate to a Detected Cadence During Image Capture FIG. 4 illustrates an example embodiment of a process for synchronizing a frame rate to a detected cadence during image capture. In some embodiments, the process is performed by the camera 130 and may be performed in real-time or approximately real-time. In some embodiments, the order and/or operations in the process are different than illustrated here.

The camera 130 initiates 402 a time lapse image capture with an initial interval between each frame of the recording. While capturing images, the camera 130 also continuously records 404 motion data of the camera 130 (e.g., motion along a vertical axis perpendicular to the ground or other axis of oscillation) representing motion of the camera 130 during the time lapse image capture. This motion data may be recorded by the sensors of the camera 130 or derived from the sensor data. Periodically, the camera 130 converts 406 the motion data in a particular window of time from time domain data to frequency domain data. The camera 130 determines 408 the dominant frequency in the frequency domain data. In one embodiment, the dominant frequency is the frequency with the highest magnitude value. The camera then modifies 410 the time lapse interval to reduce the difference between the frame rate and the dominant frequency. For example, the camera 130 may set a new interval between image frames such that subsequent frames are captured at a frequency that substantially matches (e.g., is within a predefined tolerance) of the dominant frequency. Alternatively, in order to provide smoother transitions, a filter may be applied so that the camera 130 incrementally adjusts the frame rate to bring it closer to the dominant frequency without necessarily making a significant discontinuous jump in frame rate. This process repeats until the image capture ends.

Process for Synchronizing a Frame Rate to a Detected Cadence in Post Processing

Figure 5:
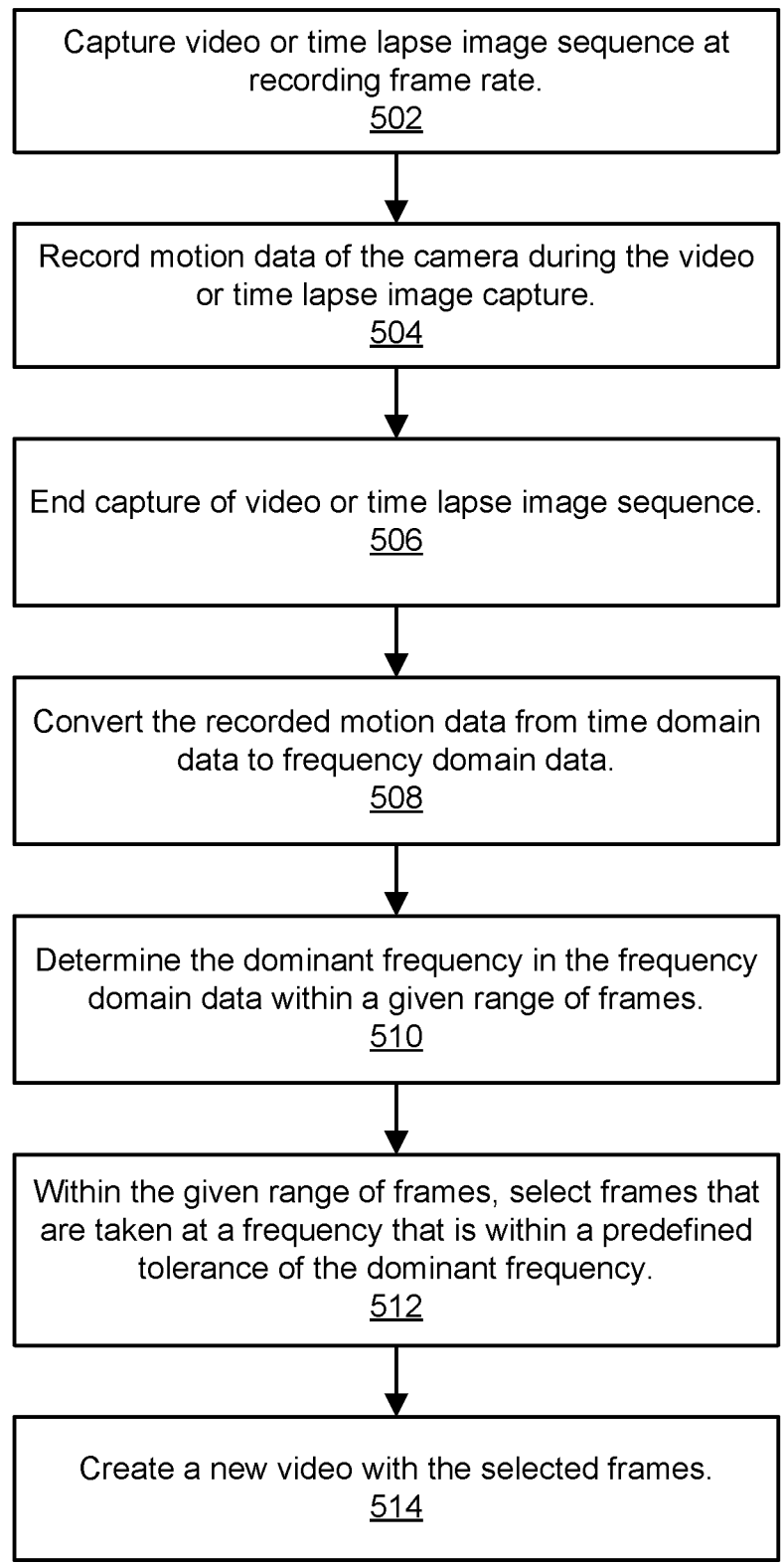
FIG. 5 illustrates an example embodiment of a process for synchronizing a frame rate to a detected cadence in post processing.

FIG. 5 illustrates an example embodiment of a process for synchronizing a frame rate to a detected cadence in post processing. In some embodiments, the process is performed by the camera 130. In some embodiments, the order and/or operations in the process are different than illustrated here.

The camera 130 initiates 502 a video recording or time lapse image capture at a frame rate significantly higher than the expected cadence frequency (e.g., 30 fps, 60 fps, 120 fps). The camera 130 also records 504 motion data (e.g., motion along a vertical axis perpendicular to the ground) representing motion of the camera 130 during image or video capture. Subsequently, the camera 130 ends 506 capture of the video or time lapse image sequence. For a given range of frames, the camera 130 converts 508 the recorded motion data from time domain data to frequency domain data. The camera 130 determines 510 the dominant frequency in the frequency domain data in the given range of frames, and then selects 512 frames that are taken at a frequency that substantially matches the dominant frequency of the detected cadence (e.g., is within a predefined tolerance of the dominant frequency). This process may be repeated for additional frame ranges so that the effective frame rate may change over time. Subsequently, the camera 130 creates 514 a new video with the selected frames.

In one embodiment, the process described here for synchronizing a frame rate to a detected cadence in post processing is performed on an external entity, such as a server or client device. The external entity receives the recording or time lapse image capture and motion data from the camera and performs the steps described herein to perform the synchronization.

Alternative Process for Synchronizing a Frame Rate to a Detected Cadence

In one embodiment, instead of performing a frequency domain analysis on the motion data, the camera 130 instead captures or selects the frames that occur when the motion data indicates a certain position (or indicates a position in a defined range) of the camera. Using this process, the frames of the recording or time lapse are all captured at the same camera position, which diminishes the effect of the oscillations due to the motion of the camera 130.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements that are not in direct contact with each other, but yet still co-operate or interact with each other.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the described embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope defined in the appended claims.

What is claimed is:

1. A method, comprising:
    determining motion data of a camera during capture of a time lapse image sequence according to an initial frame rate, the motion data determined using one or more sensors tracking motion of the camera while the camera captures the time lapse image sequence;
    determining a frequency of oscillation of the camera based on the motion data;
    determining a modified frame rate based on the frequency of oscillation of the camera; and
    capturing the time lapse image sequence according to the modified frame rate such that images of the time lapse image sequence are captured at an approximate same position of the camera.

2. The method of claim 1, wherein determining the frequency of oscillation based on the motion data comprises:
    converting the motion data from time domain data to frequency domain data; and
    determining a dominant frequency in the frequency domain data.

3. The method of claim 2, wherein the motion data is converted from the time domain data to the frequency domain data in a predefined time window.

4. The method of claim 2, wherein the motion data is converted from the time domain data to the frequency domain data using Fast Fourier Transform.

5. The method of claim 2, wherein determining the dominant frequency in the frequency domain data comprises:
    determining a frequency value in the frequency domain data that has a largest amplitude of a plurality of frequency values in the frequency domain data; and
    selecting the frequency value as the dominant frequency.

6. The method of claim 1, wherein determining the modified frame rate based on the frequency of oscillation comprises:
    setting the modified frame rate to match the frequency of oscillation.

7. The method of claim 1, further comprising:
    storing the time lapse image sequence to a storage medium.

8. The method of claim 1, wherein the motion data comprises position data along an axis of oscillation.

9. A non-transitory computer-readable storage medium storing instructions, the instructions when executed by one or more processors cause the one or more processors to:
    determine motion data of a camera during capture of a time lapse image sequence according to an initial frame rate, the motion data determined using one or more sensors of the camera;
    determine information based on the motion data, the information comprising oscillation information of the camera by instructions to:
        convert the motion data from time domain data to frequency domain data; and
        determine frequency information in the frequency domain data;
    determine a modified frame rate based on the information; and
    capture the time lapse image sequence according to the modified frame rate such that images of the time lapse image sequence are captured at an approximate same position of the camera.

10. The non-transitory computer-readable storage medium of claim 9, wherein the motion data is converted from the time domain data to the frequency domain data in a predefined time window.

11. The non-transitory computer-readable storage medium of claim 9, wherein the motion data is converted from the time domain data to the frequency domain data using Fast Fourier Transform.

12. The non-transitory computer-readable storage medium of claim 9, wherein to determine the frequency information in the frequency domain data comprises to:
   determine a frequency value in the frequency domain data that has a largest amplitude of a plurality of frequency values in the frequency domain data; and
   select the frequency value as the frequency information.

13. The non-transitory computer-readable storage medium of claim 9, wherein to determine the modified frame rate based on the information comprises to:
   set the modified frame rate to match the frequency information.

14. The non-transitory computer-readable storage medium of claim 9, storing further instructions that when executed by the one or more processors cause the one or more processors to:
   store the time lapse image sequence to a storage medium.

15. The non-transitory computer-readable storage medium of claim 9, wherein the motion data comprises position data along an axis of oscillation.

16. The non-transitory computer-readable storage medium of claim 9, wherein the modified frame rate is determined based on a dominant frequency of the frequency information.

17. An imaging device, comprising:
one or more processors; and
a non-transitory computer-readable storage medium storing instructions, the instructions when executed by the one or more processors causing the one or more processors to:
   determine camera motion of a camera during capture of a time lapse image sequence, the camera motion comprising a cadence of motion of the camera;
   determine a modified frame interval based on the cadence of the motion of the camera by converting the camera motion from time information to frequency information; and
   continue capture of the time lapse image sequence according to the modified frame interval.

18. The imaging device of claim 17, wherein the camera motion is converted from time information to frequency information using Fast Fourier Transform.

19. The imaging device of claim 17, wherein the camera motion includes position data along an axis of oscillation.

20. The imaging device of claim 17, wherein to continue capture of the time lapse image sequence according to the modified frame interval comprises to:
   incrementally adjust a current capture frame to bring an initial capture frame rate closer to a dominant frequency of the frequency information.

* * * * *